March 12, 1940.  S. SEGAL  2,192,936
ENDLESS DRIVE BELT
Filed Nov. 17, 1937
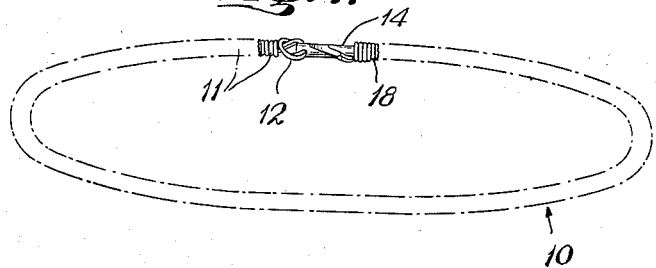
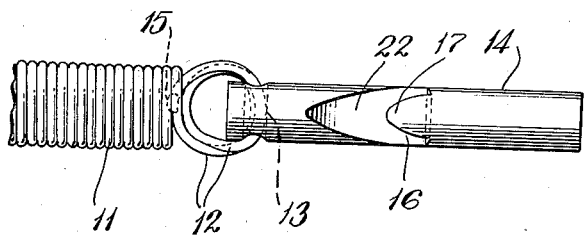
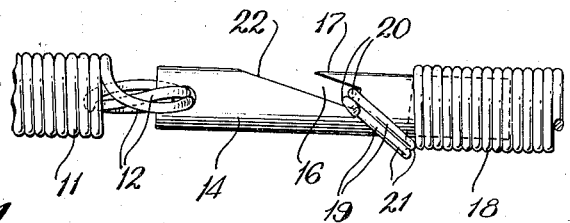
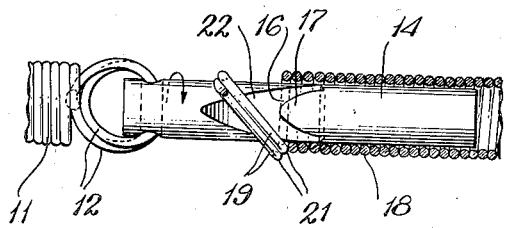
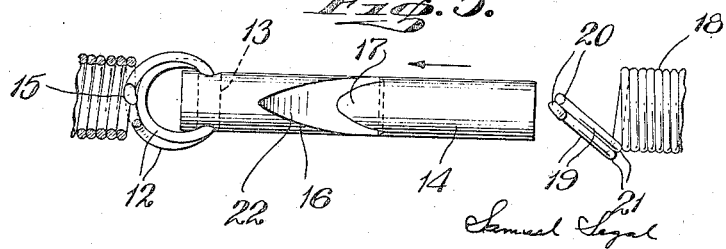
Samuel Segal
INVENTOR
BY
ATTORNEY Patented Mar. 12, 1940

2,192,936

UNITED STATES PATENT OFFICE 2,192,936

ENDLESS DRIVE BELT

Samuel Segal, Brooklyn, N. Y.

Application November 17, 1937, Serial No. 174,933

8 Claims. (Cl. 74—238)

The subject matter of this invention is an elastic power drive belt and the dominating object thereof is to provide an improved endless belt of the wire coiled type having a novel and simplified connection between the ends thereof for positively holding the latter in proper position. The invention has as a further object an improved connection between the ends of a drive belt characterized by a notched stud swingably carried by one or more coils of one end of the belt and cooperating to conveniently receive and interlock with inclined coils of the adjacent end of the belt to hold the latter in a secure and endless formation. The invention has as a further object the provision of a serviceable connection between the ends of the belt whereby one end thereof may be readily attached to a swingable stud and adapted to be conveniently disconnected therefrom when desired. Other objects, advantages, and features of the invention will be apparent from the following detailed description considered in the light of the accompanying drawing in which:

Fig. 1 is a side view of the endless drive belt according to my invention, showing the ends of the belt connected to a swingable stud carried by one of these ends.

Fig. 2 is a plan view of an enlarged fragmentary portion of the belt showing the notched stud swingably carried by several coils or eyes of one end of the wired coiled belt.

Fig. 3 is an enlarged side view of the detachable connection between the ends of the belt.

Fig. 4 is a plan view of Fig. 3 however partly in section and illustrating the manner in which the inclined loops or eyes of one end of the belt may be disconnected from the swingable stud and Fig. 5 is a plan view of a fragmentary part of the belt, however, illustrating the manner in which the end of the belt carrying the inclined coils may be readily attached to the swingable stud.

Illustrative of the embodiment disclosed, the endless hollow belt generally designated 10 is of the conventional elastic coiled wire type. However, one end 11 of the belt has one or more of its coils or eyes bent substantially normally to the body of the belt and these coils are threaded through a bore 13 of a stud 14 and the free end 15 of the outermost eye 12 is bent inwardly and offset to prevent accidental withdrawing or unthreading of the loops 12 from the stud. Since bore 13 is larger than the width of the coils 12, the latter serve as fulcrum means to swingably support stud 14 which includes an inclined or biased kerf or recess 16 defining the overhanging lip 17.

The other end 18 of the belt which in effect constitutes a socket adapted to closely but slidably receive stud 14 has two of its loops or eyes 19 bent out of the body thereof and are normally disposed at an incline with respect thereto. As shown in Fig. 5, the inclined loops 19 are disconnected from the cylindrical stud 14 and the upper parts 20 thereof are furthest away from socket end 18 of the belt but below the elevation of the upper portion of the latter. In such relation of loops 19, stud 14 may be conveniently inserted therein and connected thereto. To this end stud 14 is first arranged so that lip 17 is at the upper part of the stud. This is accomplished by manually rotating stud 14. Thereafter with portions 20 of the coils 19 above base portions 21, the stud is inserted within coils 19 and is slidably moved within socket end 18 until upper portions 20 pass over lip 17 and resiliently fall into the inclined or biased notch 16 after which socket end 18 of the belt is retracted and therefore portions 20 of coils 19 are disposed at the base of notch 16 and about the attenuated part of the stud, thus interlocking therewith and with lip 17.

According to the invention, loops 19 cannot be removed from notch 16 unless loops 19 are first withdrawn from notch 16 to first clear lip 17 and after this is accomplished stud 14 must be rotated approximately one hundred and eighty degrees in respect to socket 18 in order to position the base portions 21 of the loops above lip 17. If for example, loops 19 are withdrawn from notch 16 but the stud 14 is not rotated about its longitudinal axis one hundred and eighty degrees in respect to coils 19, the latter if retracted will always be directed back into notch 16 due to the long slope of the bottom guide face 22 of the latter.

If therefore inclined or biased coils or eyes 19 are connected to stud 14 as shown in Fig. 3, and it is desired to detach coils 19, the latter are moved out of notch 16 to be clear of lip 17, and thereafter stud 14 is rotated one hundred and eighty degrees relative to coils 19, note for example, the direction of rotation as indicated by the arrow in Fig. 4. Of course it is immaterial whether socket end 18 is turned one hundred and eighty degrees relative to the stud or whether the latter is turned in respect to coils 19. In either case, coils 19 could not interlock with lip 17 since bases 21 thereof are now free of or above lip 17 and therefore coils 19 may be moved over lip 17 and consequently end 18 of the belt may be completely detached from the stud.

Since the present invention contemplates the utilization of several of the coils of the belt to interconnect with the stud, and if after considerable use these coils wear out or break off, it is an easy matter even for an unskilled party to bend out several other coils of the ends of the belt and position these as in the case of coils 12 and 19.

In the broader aspects of the invention, I do not desire to be understood as limiting the embodiment thereof to details herein shown illustratively as a wide variety of modifications may be made within the scope of the invention.

I claim:

1. A drive belt comprising an elastic body having a plurality of coils, one end of said belt comprising one or more coils disposed substantially normal to said body, a stud swingably mounted on said last mentioned coils and including a reentrant notch having sides disposed at an incline in respect to the longitudinal axis of said stud and defining a lip overchanging one of said sides, and another end of said belt having one or more coils disposed at an incline in respect to said body and adapted to be removably received in said notch to interlock with a reduced part of said stud at one end of said notch.

2. A drive belt comprising an elastic body having a plurality of coils, a stud having a biased notch, means swingably holding said stud to one end of said body, and another end of said belt having one or more coils disposed at an incline thereto and adapted to be slidably moved over said stud and to fall into said notch to interlock with said stud.

3. A drive belt comprising an elastic body having a plurality of coils, a stud having a biased notch, means swingably holding said stud to one end of said body, and another end of said belt having one or more coils disposed at an incline thereto and adapted to be slidably moved over said stud and to fall into said notch to interlock with said stud, said stud upon its interlocking relation with said inclined coils having a part removably disposed within said last mentioned end of said belt.

4. A drive belt comprising an elastic body, a stud swingably carried by one end of said body and including a biased notch, and another end of said body having inclined means adapted to move over said stud and a socket adapted to receive one end of said stud, said inclined means being adapted to enter said notch to interlock with said stud.

5. An elastic drive belt, a detachable connection between the ends of said belt, said connection comprising a swingable member having a biased notch defining a lip and a reduced portion, one of said ends including inclined loop means adapted to be received by said notch and under said lip and against said reduced portion and including a socket adapted to receive an end of said stud contiguous to said reduced portion.

6. An elastic drive belt comprising a body having a plurality of coils, one end of said body having one or more eyes, a stud swingably mounted on said eyes and including a biased notch defining a lip, another end of said body including one or more inclined eyes and a socket, said inclined eyes adapted to be moved along said stud to interlock with the walls of said notch and lip to prevent separation of said inclined eyes from said stud.

7. An elastic drive belt comprising a body having a plurality of coils, one end of said body having one or more eyes, a stud swingably mounted on said eyes and including a biased notch defining a lip, another end of said body including one or more inclined eyes and a socket, said inclined eyes adapted to be moved along said stud to be received in said notch to interlock with the walls of said notch to prevent separation of said inclined eyes from said stud, said inclined eyes adapted to be withdrawn from said notch upon shifting of said stud relative thereto and adapted to be free of said lip upon rotational displacement of said stud relative to said inclined eyes to position base portions of said inclined eyes in an unlocking relation with said lip.

8. An endless elastic drive belt comprising a plurality of coils, one end of said body having one or more eyes, a stud swingably mounted on said eyes and including a biased notch defining a lip, another end of said body including one or more inclined eyes and a socket, said inclined eyes adapted to be moved along the length of said stud to be received in said notch to interlock with the walls of said notch to prevent separation of said inclined eyes from said stud, said inclined eyes adapted to be withdrawn from said notch upon shifting of said stud relative thereto and adapted to be free of said lip upon rotational displacement of said stud relative to said inclined eyes to position base portions of said inclined eyes in an unlocking relation with said lip, said inclined eyes during unlocking relation thereof with said lip adapted to be slidably removed from said stud to disconnect said last mentioned end of said belt therefrom.

SAMUEL SEGAL.